United States Patent
Miles et al.

(10) Patent No.: US 6,168,170 B1
(45) Date of Patent: *Jan. 2, 2001

(54) CHUCK WITH JAW BLADE ROTATIONAL STOP

(75) Inventors: Kevin C. Miles, Clemson; Christopher B. Barton, Seneca; William H. Aultman, Pickens, all of SC (US)

(73) Assignee: Power Tool Holders Incorporated, Christiana, DE (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/016,096

(22) Filed: Jan. 30, 1998

(51) Int. Cl.[7] .................................................. B23B 31/12
(52) U.S. Cl. ................................ 279/62; 279/48; 279/52; 279/56; 279/59; 279/69; 279/123; 279/902
(58) Field of Search .................................. 279/47–49, 52, 279/53, 56, 59–65, 69, 70, 123, 114–116, 902

(56) References Cited

U.S. PATENT DOCUMENTS 2,075,031 * 3/1937 Emrick ..................... 279/63
4,775,159 * 10/1988 Manshitz ................... 279/62
5,913,524 * 6/1999 Barton ...................... 279/62

FOREIGN PATENT DOCUMENTS

3628798 * 3/1988 (DE) ........................ 279/62

* cited by examiner

Primary Examiner—Steven C. Bishop
(74) Attorney, Agent, or Firm—Nelson Mullins Riley & Scarborough, LLP

(57) ABSTRACT

A chuck is provided for use with a manual or powered driver, such as a drill. The chuck has a body member with angularly disposed passageways formed therethrough. A plurality of jaws are slidably positioned within the angularly disposed passageways. The jaws grip upon a tool shank inserted into the body member. A nut is rotatably mounted on the body member and has nut threads defined on an inner circumference thereof in engagement with the jaw threads. A sleeve member is in driving rotational engagement with the nut whereby when the sleeve is rotated with respect to the body member, the jaws are also moved within the passageways. A rotational stop is defined between the nut and jaws wherein upon the jaws reaching a predetermined position within the passageways, further rotation of the nut in an opening direction is prevented. The stop comprises a radially extending surface defining an end of the nut threads. The radially extending surface contacts a side surface of at least one of the jaws.

14 Claims, 3 Drawing Sheets

CHUCK WITH JAW BLADE ROTATIONAL STOP

BACKGROUND OF THE INVENTION

The present invention relates generally to chucks for use with drills or other electric or pneumatic power drivers. More particularly, the present invention relates to a chuck of the keyless type which may be tightened or loosened by hand.

Both hand and electric or pneumatic tool drivers are well known in the art. Twist drills are the most common tools used with such drivers. However, the tools may also comprise screw drivers, nut drivers, burs, grinding stones, and other cutting or abrading tools. Since the tool shanks may be of varying diameter or multi-sided cross section, the drill or like device is usually provided with a chuck adjustable over a relatively wide range for accommodating a wide range of tool bits. The chuck may be attached to the driver by a threaded or tapered bore, or any other suitable mechanism.

A variety of chuck types have been developed in which a gripping mechanism, such as a plurality of jaws, is actuated by relative rotation between a body member and an annular nut. In an oblique jawed chuck, for example, the body member includes three passageways disposed approximately 120° apart from each other. The passageways are configured so that their centerlines meet at a point along the chuck axis forward of the chuck body. The jaws are constrained by and movable within the passageways to grip a cylindrical tool shank disposed approximately along the chuck's centerline axis. The nut rotates about the chuck's axis and engages threads on the jaws so that rotation of the nut moves the jaws in either direction in the passageways. The body and nut are configured so that rotation of the nut in one direction (closing direction) with respect to the body forces the jaws into gripping relationship with the tool shank, while rotation in the opposite direction (opening direction) releases the gripping relationship. Such a chuck may be keyless if it is rotated by hand. One example of such a chuck is disclosed in U.S. Pat. No. 5,125,673 commonly assigned to the present assignee and incorporated herein in its entirety by reference. Various configurations of keyless chucks are known in the art and are desirable for a variety of applications.

In chucks having a plurality of jaws driven by relative rotation between the nut and the body, the jaws include a threaded portion cut into the jaw. This threaded portion generally has a flat surface at the forward edge thereof. With prior art chucks, when the nut is rotated in the opening direction so that the jaws are driven to their fully retracted position (a position where the tool engaging portions of the jaws are drawn to their fullest radially outward position with respect to the chuck axis), the flat surfaces of the jaw threads abut against an opposing flat surface of the nut in a pure frictional engagement. Further rotation of the nut increases the frictional force between the opposing surfaces until further rotation in the opening direction is inhibited. However, the frictional forces also resist subsequent rotation of the nut in the closing direction, and the operator typically must overcome these forces if the chuck is to be closed to grip upon a tool. These forces can be relatively great if the jaws were torqued excessively in the opening direction wherein the opposing frictional forces are relatively great. In certain instances, the jaws can actually become frictionally bound in the fully retracted position.

OBJECTS AND SUMMARY OF THE INVENTION

The present invention recognizes and addresses the foregoing considerations, and others, of prior art constructions and methods.

Accordingly, it is an object of the present invention to provide an improved chuck.

It is another object of the present invention to provide a chuck having a rotational stopping mechanism to prevent binding of the jaws and nut.

Additional objects and advantages of the invention will be set forth in part in the following description, or may be obvious from the description, or may be learned through practice of the invention.

In accordance with the objects and purposes of the invention, a chuck is provided for use with manual or powered drivers, such as portable electric drills and the like, having a rotatable drive shaft. The chuck is mounted to the drive shaft in any conventional manner, including threaded attachment, tapered bores, etc. The chuck includes a body member having a nose section and a tail section. The nose section has an axial bore formed therein for receipt of a tool bit, and a plurality of angularly disposed passageways formed therethrough that intersect the axial bore. The chuck includes a gripping mechanism for holding a tool bit inserted into the chuck. The gripping mechanism preferably comprises a plurality of jaws slidably positioned in the angularly disposed passageways. Each jaw has a tool engaging face formed on one side thereof and threads formed on the opposite side thereof. A nut rotatably mounted on the body member has threads defined on an inner circumferential surface thereof in engagement with the threads on the jaws. A sleeve member is provided in driving rotational engagement with the nut. When the sleeve is rotated with respect to the body member, the jaws will thus also be rotated.

The chuck according to the invention also includes a rotational stop mechanism or device defined between the nut and the jaws wherein upon the jaws reaching a predetermined position within the passageways that generally corresponds to the fully opened position of the jaws, further rotation of the nut in the opening direction is prevented. This rotational stop comprises a radially extending surface that defines the end of the nut threads. This radially extending surface contacts a side surface of one of the jaws when all of the jaws are in their fully opened or retracted position. The side surface of the jaw that comes into the contact with the radially extending surface may be a side surface that defines the end of the jaw threads or the beginning of the jaw blade tool engaging face.

In a preferred embodiment of the invention, the side surface of the jaw comprises a circumferential surface that extends between the threads and the opposite tool engaging face.

The radially extending surface on the nut preferably comprises a radial wall that defines the end of the last nut thread. This radial wall may also extend tangentially relative to the rotational axis of the nut.

In a preferred embodiment, the side surface of the jaw comprises a curved circumferential surface. In this embodiment, the radially extending surface of the jaw may comprise a correspondingly shaped curved surface.

Other objects, features, and aspects of the present invention are discussed in greater detail below.

DETAILED DESCRIPTION OF THE PREFERRED EMBODIMENTS

Reference will now be made in detail to the presently preferred embodiments of the invention, one or more examples of which are illustrated in the accompanying drawings. Each example is provided by way of explanation of the invention, and not meant as a limitation of the invention. In fact, it will be apparent to those skilled in the art that modifications and variations can be made in the present invention without departing from the scope and spirit of the invention. For example, features illustrated or described as part of one embodiment may be used on another embodiment to yield a still further embodiment. Thus, it is intended that the present invention cover such modifications and variations as come within the scope of the appended claims and their equivalents.

Figure 1:
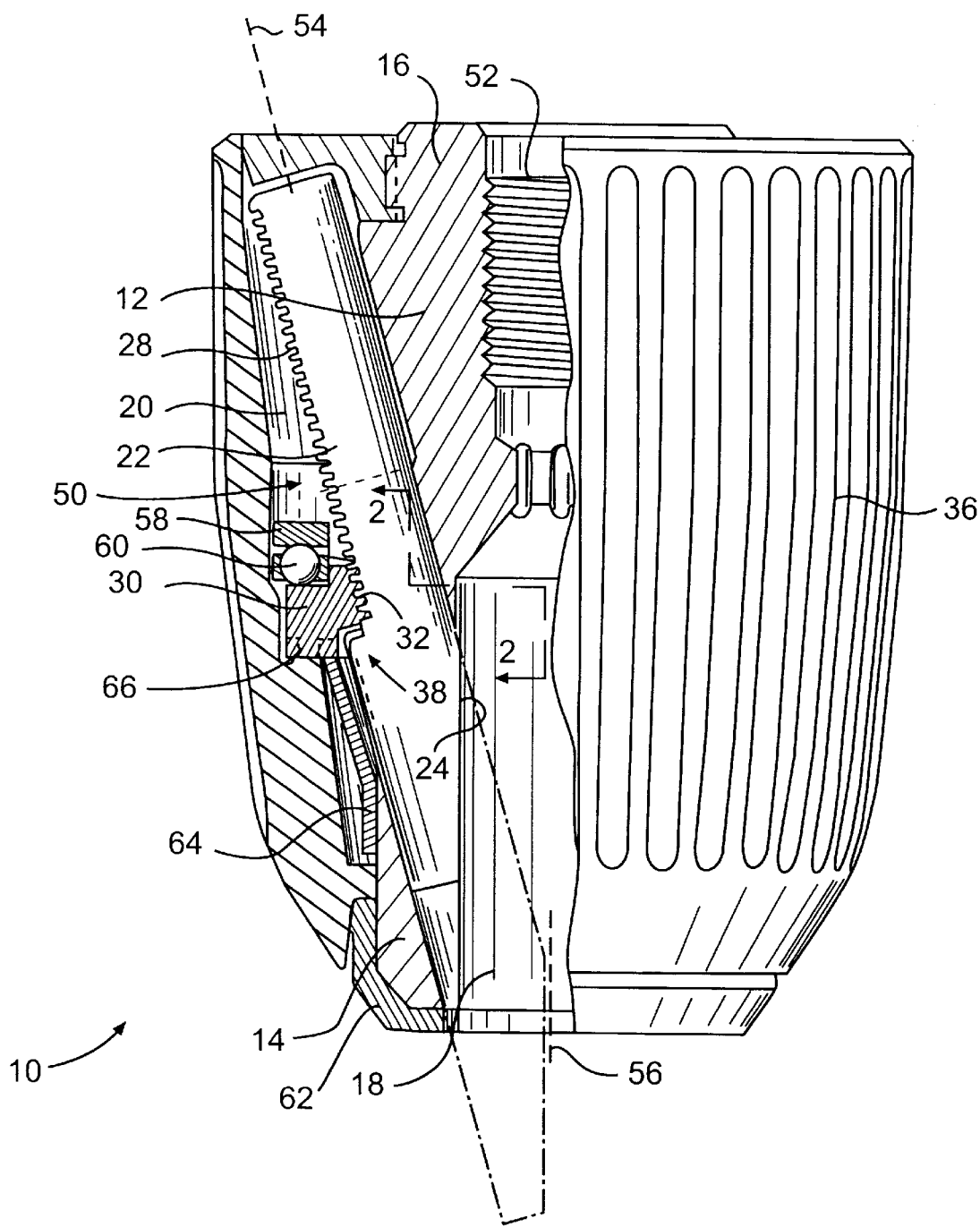
FIG. 1 is a longitudinal partial cross-sectional view of a chuck in accordance with a preferred embodiment of the invention.

Referring to FIG. 1 in particular, a presently preferred embodiment of the present invention is illustrated in the form of an oblique jaw chuck. It should be understood, however, that this illustration is provided by way of explanation of the invention only and that the invention is applicable to any suitable chuck in which a gripping mechanism, such as a jaw, is actuated through relative rotation of a nut in a chuck body.

Chuck 10 includes a sleeve member 36, a body member 12, and a gripping mechanism, generally 50. In the embodiment illustrated, gripping mechanism 50 includes a plurality of jaws 22. Body 12 is generally cylindrical in shape and comprises a nose or forward section 14 and a tail or rearward section 16. An axial bore 18 is formed in forward section 14. Axial bore 18 is dimensioned somewhat larger than the largest tool shank that chuck 10 is designed to accommodate. A threaded bore 52 is formed in tail section 16 and is of a standard size to mate with a drive shaft of a powered or hand driver, for example a power drill having a spindle. The bores 44 and 46 may communicate at a central region of body 12. While a threaded bore 52 is illustrated in the figure, such bore could be replaced with a tapered bore of a standard size to mate with a tapered drive shaft or with any suitable connection mechanism. Various means and devices are known in the art for attaching chucks to drive shafts or spindles and any such means are within the scope and spirit of the invention.

Passageways 20 are formed in body 12 to accommodate each jaw 22. Three jaws 22 are employed, and each jaw is separated from the adjacent jaw by an arc of approximately 120°. The axis 54 of the passageways 20 are angled with respect to the chuck axis 56 and intersect the chuck axis at a common point ahead of chuck body 12. Each jaw 22 has a tool engaging face or portion 24, which is generally parallel to chuck axis 56, on one surface thereof and threads 28 on the opposite or outer surface. Threads 28 may be constructed with any suitable pitch.

Body member 12 includes a thrust ring member 58 which, in a preferred embodiment, may be integral with body 12. In an alternative embodiment, thrust ring 58 may be a separate component from body member 12.

Chuck 10 may also include a bearing assembly 60, for example the washer and caged roller illustrated in FIG. 1.

Chuck 10 also includes an annular nut 30. Nut 30 may be a one piece nut which includes threads 32 for threaded engagement with threads 28 on jaws 22. Nut 30 is positioned about body 12 and is in threaded engagement with jaws 22 so that when the nut is rotated with respect to body 12, the jaws will be advanced or retracted within their respective passageways 20.

The outer circumferential surface of sleeve 36 may be knurled or may be provided with longitudinal ribs, or any other configuration, to enable a user to grip the sleeve securely. Sleeve 36 may be fabricated from a structural plastic such as a polycarbonate, a filled polypropylene, for example a glass filled nylon, or a blend of structural plastic materials. As should be appreciated by one skilled in the art, the materials from which sleeve 36 is fabricated will depend on the end use of the chuck, and the above discussion is provided by way of example only.

Figure 2:
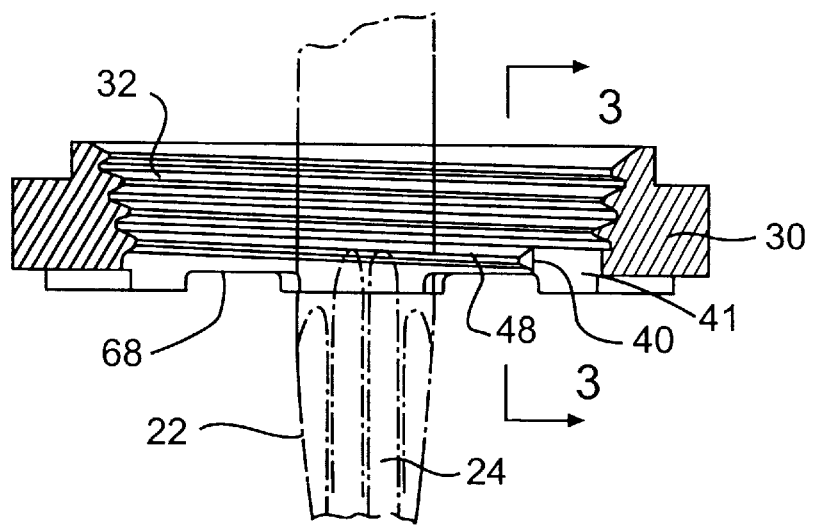
FIG. 2 is a partial cross-sectional view taken along the lines indicated in FIG. 1.
Figure 3:
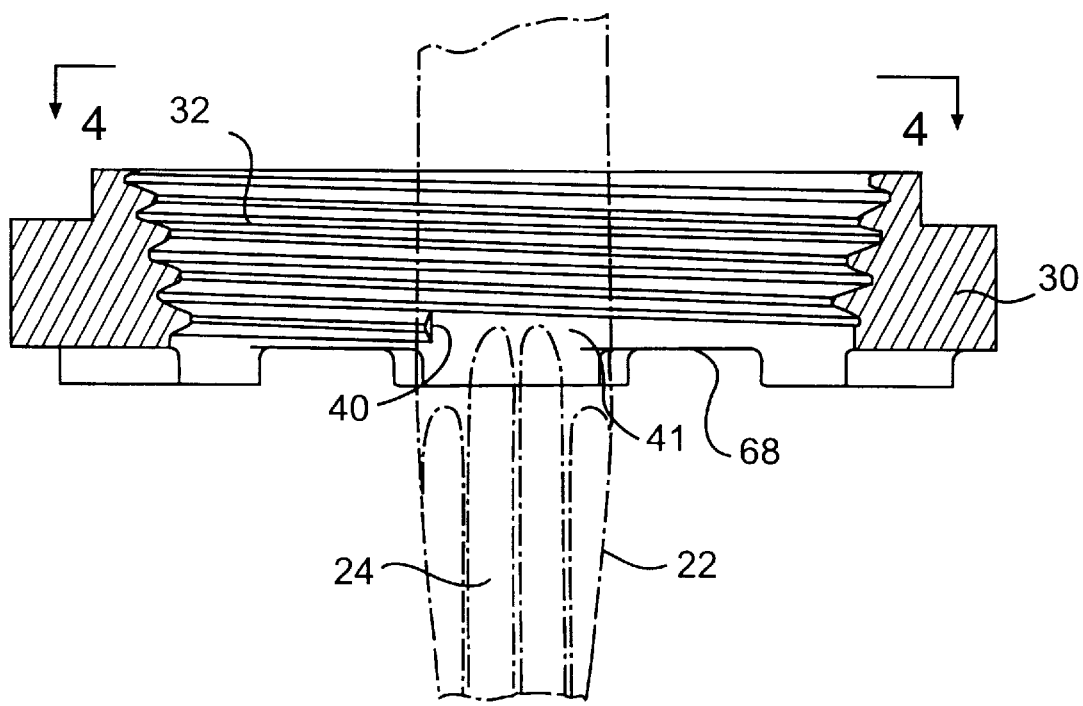
FIG. 3 is an alternate partial cross-sectional view taken along the lines indicated in FIG. 2.
Figure 4:
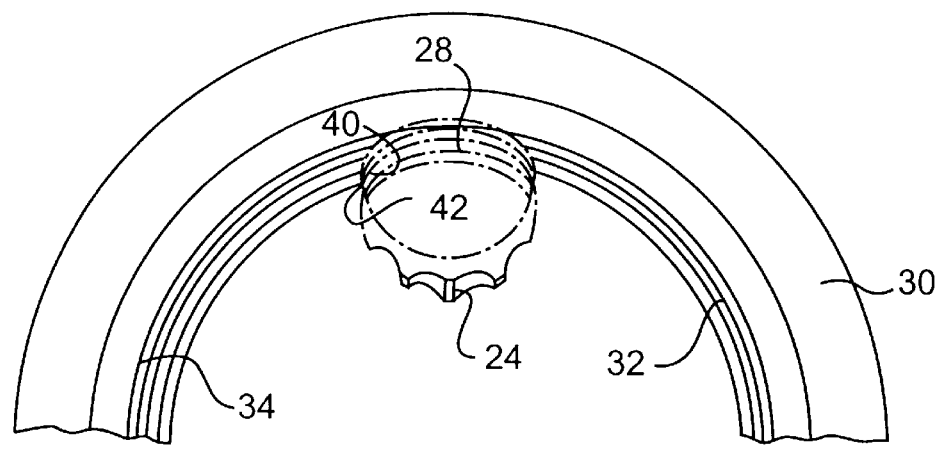
FIG. 4 is a cross-sectional view of a portion of the nut taken along the lines indicated in FIG. 3.

In the embodiment illustrated in FIG. 1, sleeve 36 is axially secured with respect to body 12 by nose piece 62 which is pressed onto forward section 14 of body 12. Nut 30 is maintained in place by retaining ring 64. Retaining ring 64 is annular cone that is pressed onto forward section 14 and engages nut 30. Drive dogs 66 defined in sleeve 36 are received by slots 68 (FIGS. 2 and 3) to rotationally fix sleeve 36 to nut 30.

It should be understood, however, that various means may be used to rotationally fix sleeve 36 to nut 30. For example, nut 30 may be press-fitted into sleeve 36, or may be co-molded directly with sleeve 36. Any and all such means for rotationally fixing the sleeve and nut are within the scope and spirit of the invention.

Because sleeve 36 is rotationally fixed to nut 30, rotation of sleeve 36 with respect to body 12 also rotates nut 30 with respect to the body. Rotation of nut 30 moves jaws 22 axially within passageways 20 due to the engagement of nut threads 32 and jaw threads 28. The direction of axial movement of jaws 22 depends on the rotational direction of sleeve 36 and nut 30 with respect to body 12. If a tool, such as a drill bit, is inserted into bore 18, the sleeve and nut may be rotated about chuck axis 56 in a closing direction so that jaws 22 move to a closed position indicated in dashed lines in FIG. 1 wherein tool engaging surfaces 24 of jaws 22 grippingly engage the tool. Rotation about axis 56 in the opposite or opening direction moves the jaws axially rearward out of the closed position to an open position as illustrated in solid lines in FIG. 1.

A chuck 10 according to the present invention includes a rotational stop mechanism or device, generally indicated as element 38 in FIG. 1. As the jaws 22 are moved to their open or fully retracted position as indicated in FIG. 1, the jaws 22 and nut 30 would tend to frictionally bind if not for the rotational stop device or mechanism 38. Referring particularly to FIGS. 2 through 5, rotational stop mechanism 38 includes a radially extending surface or wall 40 that essentially defines the end of nut threads 32. For example, referring to FIGS. 2 and 3, radially extending surface 40 extends radially inward with respect to chuck axis 56 and defines the end of last thread 48 of nut 30. The plane of radially extending surface 40 is indicated by the line 43 illustrated in FIG. 5. A generally smooth or flat surface 41 is defined adjacent to radially extending surface 40 within the inner circumference of nut 30.

Figure 5:
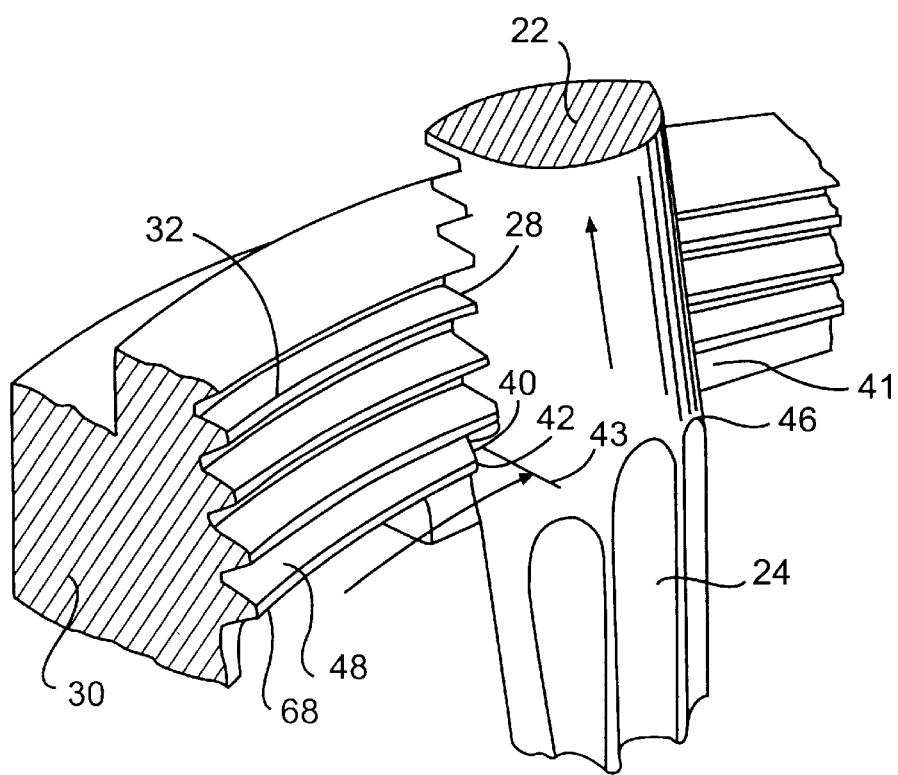
FIG. 5 is a perspective view of the rotational stop according to the invention.

In operation, nut 30 is rotated in an opening direction and jaws 22 are threadedly retracted within passageways 20. When jaws 22 reach their fully retracted position, radially extending surface 40 will come into contact with a side surface 42 of one jaw 22. Side surface 42 extends generally from the tool engaging face 24 to the beginning of jaw threads 28, as can be seen particularly in FIG. 5. Side surface 42 may have a radial component, as illustrated in FIG. 5, since jaws 12 are commonly machined as semi-circular components. In this regard, radially extending surface 40 may have a complimenting shape so as to essentially contact side surface 42 in a flush manner. Thus, it should be understood, that side surface 42 must extend radially to the extent necessary to contact radially extending surface 40 defined in threads 32 of nut 30. For this reason, it is relatively simple to define side surface 42 as the portion of the jaw stock at the beginning 46 of the tool engaging surface 24. The only requirement is that side surface 42 extend at least as far as radially extending surface 40. Side surface 42 will move rotationally along the unthreaded or flat surface 41 prior to contacting surface 40. Thus, flat surface 41 has at least the same radial depth or distance from axis 56 as the valleys of nut threads 32.

In the embodiment illustrated, radially extending surface 40 is configured as a wall that defines the last thread 48 of jaw threads 32. However, it should be appreciated, that radially extending surface 40 can have any manner of shapes or dimensions so as to contact a side surface 42 of a jaw 22 once the jaws reach their fully retracted position. For example, surface 40 may comprise a ball, peg or insert device, and the like. The only requirement is that surface 40 extends radially from threads 32 to engage a side surface of a jaw 22 to prevent further rotation of nut 30 with respect to all of the jaws. In this regard, it should be appreciated that the rotational stop device according to the invention acts only on a single jaw that comes into contact with radially extending surface 40. In this manner, it is not necessary to define stops for each of the jaws. So long as the jaws maintain their threaded alignment and engagement with nut 30, the same jaw 22 should contact radially extending surface 40 at all times. In this regard, it may be preferred to specifically define one of the jaws 22 with a more pronounced or defined side surface to ensure essentially flush and non-binding contact with radially extending surface 40. For example, a flat non-radial side surface 42 may be defined on one of the jaws to contact an essentially radial flat wall 40. Any number of variations can be made in this regard.

It should be appreciated by those skilled in the art that various modifications and variations can be made in the present invention without departing from the scope and spirit of the invention. For example, any manner of rotational stop device can be configured to protrude radially from the end of the nut threads to contact one of the jaws upon the jaws reaching their fully retracted position. It is intended that the present invention cover such modifications and variations as come within the scope and spirit of the appended claims and their equivalents.

What is claimed is:

1. A chuck for use with a manual or powered driver having a rotatable drive shaft, said chuck comprising:
   a body member having a nose section and a tail section, said nose section having an axial bore formed therein and a plurality of angularly disposed passageways formed therethrough and intersecting said axial bore;
   a plurality of jaws slidably positioned in said angularly disposed passageways, each of said jaws having a tool engaging face formed on one side thereof and threads formed on an opposite outer surface thereof;
   a nut rotatably mounted on said body member, said nut having threads defined on an inner circumferential surface thereof in engagement with said threads on said jaws;
   a sleeve member in driving rotational engagement with said nut whereby when said sleeve is rotated with respect to said body member, said jaws will be moved thereby; and
   a rotational stop defined between said nut and said jaws wherein upon said jaws reaching a predetermined position within said passageways further rotation of said nut in an opening direction is prevented, said stop comprising a radially extending surface defining an end of said nut threads, said radially extending surface contacting a side surface of one of said jaws.

2. The chuck as in claim 1, wherein said side surface of said jaw defines an end of said jaw threads.

3. The chuck as in claim 2, wherein said side surface of said jaw extends between said threads and a beginning of said tool engaging face.

4. The chuck as in claim 1, wherein said radially extending surface comprises a wall defining an end of a last nut thread.

5. The chuck as in claim 1, wherein said radially extending surface also extends tangentially relative to a rotational axis of said nut.

6. The chuck as in claim 1, wherein said side surface of said jaw comprises a curved surface, said radially extending surface comprising a curved surface complimenting that of said jaw.

7. A chuck for use with a manual or powered driver having a drive spindle, said chuck comprising:
   a generally cylindrical body, said body having a forward section and a rearward section, said rearward section adapted to mate with said drive shaft of said driver;
   a gripping mechanism actuatable to a closed position wherein said gripping mechanism axially and rotationally retains a tool with respect to said body, and to an open position wherein said gripping mechanism releases said tool retained therein;
   an annular nut disposed about said body and having threads in threaded engagement with said gripping mechanism so that rotation of said nut about said body in a closing direction actuates said gripping mechanism to said closed position and rotation of said nut in an opening direction actuates said gripping mechanism to said open position; and
   a rotational stop configured between said nut and said gripping mechanism, said rotational stop comprising a radial surface defined in said nut threads that prevents further rotation of said nut in said opening direction upon said radial surface contacting said gripping mechanism.

8. The chuck as in claim 7, wherein said rotational stop comprises a radial wall defining an end of said nut threads.

9. The chuck as in claim 8, wherein said radial wall is defined within said nut threads without extending axially beyond said nut threads.

10. The chuck as in claim 7, further comprising a sleeve member received over and rotatable relative to said body, said sleeve being in rotational engagement with said nut so that rotation of said sleeve relative to said body rotates said nut relative to said body.

11. The chuck as in claim 7, wherein said forward section of said body has an axial bore formed therein and a plurality of angularly disposed passageways formed therethrough that intersect said bore in said forward section.

12. The chuck as in claim 11, wherein said gripping mechanism includes a plurality of jaws with a said jaw disposed within each of said passageways, each of said jaws having a radially inward disposed jaw face on one side thereof and jaw threads defined on an opposite side thereof.

13. The chuck as in claim 12, wherein said rotational stop contacts a single said jaw.

14. The chuck as in claim 13, wherein said jaw has a generally curved surface extending between said jaw threads and said jaw face, said rotational stop contacting said jaw on said curved surface, said rotational stop having a complimenting curved surface generally matching that of said jaw.

* * * * *